United States Patent [19]
Blackburn et al.

[11] Patent Number: 4,764,430
[45] Date of Patent: Aug. 16, 1988

[54] CROSSLINKABLE COMPOSITIONS CONTAINING POLYEPOXIDES AND POLYACID CURING AGENTS

[75] Inventors: William P. Blackburn, Evans City; Debra L. Singer, Pittsburgh, both of Pa.

[73] Assignee: PPG Industries, Inc., Pittsburgh, Pa.

[21] Appl. No.: 1,304

[22] Filed: Jan. 8, 1987

Related U.S. Application Data

[63] Continuation-in-part of Ser. No. 837,118, Mar. 7, 1986, Pat. No. 4,681,811, which is a continuation-in-part of Ser. No. 767,020, Aug. 19, 1985, Pat. No. 4,650,718, and a continuation-in-part of Ser. No. 767,019, Aug. 19, 1985, Pat. No. 4,703,101.

[51] Int. Cl.$^4$ .................. B05D 1/36; B05D 7/00; B32B 27/38; C08G 59/40
[52] U.S. Cl. .................. 428/413; 427/407.1; 427/410; 528/112
[58] Field of Search .................. 427/407.1, 410; 428/413; 528/112

[56] References Cited

U.S. PATENT DOCUMENTS

| | | | |
|---|---|---|---|
| 2,857,354 | 10/1958 | Fang | 260/33.2 |
| 3,730,930 | 5/1973 | Labana | 260/23 EP |
| 4,027,066 | 5/1977 | Victorius | 428/334 |
| 4,119,593 | 10/1978 | Smith et al. | 260/18 EP |
| 4,346,144 | 8/1982 | Craven | 428/335 |
| 4,355,071 | 10/1982 | Chang | 427/410 X |
| 4,403,093 | 9/1983 | Hartman et al. | 525/440 X |

Primary Examiner—Michael R. Lusignan
Attorney, Agent, or Firm—William J. Uhl

[57] ABSTRACT

Curable, liquid coating compositions based on polyepoxides and polyacid curing agents are disclosed. The compositions also contain volatile components such as solvent or curing agents which release volatile components upon curing. Also present is a relatively long chain aliphatic monocarboxylic acid which is present to improve the appearance of the coatings. The compositions are useful as coating compositions particularly as clear coats in color-plus-clear automotive coatings.

26 Claims, No Drawings

CROSSLINKABLE COMPOSITIONS CONTAINING POLYEPOXIDES AND POLYACID CURING AGENTS

CROSS-REFERENCE TO RELATED APPLICATIONS

This application is a continuation-in-part of application Ser. No. 837,118, filed on Mar. 7, 1986, now U.S. Pat. No. 4,681,811, patented July 31, 1987, which is a continuation-in-part of application Ser. No. 767,020, filed on Aug. 19, 1985, now U.S. Pat. No. 4,650,718, patented Mar. 17, 1987. This application is also a continuation-in-part of application Ser. No. 767,019, filed on Aug. 19, 1985, now U.S. Pat. No. 4,703,101, patented Oct. 27, 1987.

BACKGROUND OF THE INVENTION

1. Field of the Invention

The present invention is in the field of curable compositions and more particularly to curable coating compositions which are useful as clear coats in color-plus-clear coating applications. The invention also relates to a process for preparing color-plus-clear coated articles and to the coated articles themselves.

2. Brief Description of the Prior Art

Color-plus-clear coating systems involving the application of a colored or pigmented base coat to a substrate followed by the application of a transparent or clear top coat to the base coat are becoming increasingly popular as original finishes for automobiles. The color-plus-clear systems have outstanding gloss and distinctness of image, and the clear coat is particularly important for these properties. Two-pack clear coat compositions comprising polyols such as polyester polyols, polyurethane polyols and acrylic polyols and polyisocyanate curing agents give outstanding gloss and distinctness of image. However, the polyisocyanates are difficult to handle being sensitive to moisture and require cumbersome safety precautions because of their toxicity.

The patent applications mentioned under "Cross-Reference to Related Applications" disclose crosslinkable coating compositions which avoid the problems of polyisocyanate curing agents. The crosslinkable coating compositions are based on polyepoxides and polyacid curing agents. Although these coatings can be formulated to produce coatings with excellent adhesion, gloss and distinctness of image (i.e., ability to reflect images in a clear, well-defined manner), these compositions sometimes need an auxiliary crosslinking agent to provide optimum solvent resistance.

A good auxiliary crosslinking agent is an aminoplast, however, the aminoplast sometimes adversely affects the appearance of the resultant coating in that holes or bubbles known as popping often develop in the surface of the coating during curing. It has been found that the incorporation of a relatively long carbon chain monocarboxylic acid into the coating formulation helps to overcome the popping problem and provide for better appearance in the coating. It has also been found that the long carbon chain monocarboxylic acid also helps to overcome the popping problems caused by certain volatile solvents in the coating composition.

SUMMARY OF THE INVENTION

The present invention provides for a curable, liquid coating composition containing components which volatilize at curing temperature comprising:
 (a) a polyepoxide,
 (b) a polyacid crosslinking agent, and
 (c) a monocarboxylic acid containing at least 6 carbon atoms.

The invention also provides a process for applying a color-clear composite coating to a substrate in which the crosslinkable composition described above is in the clear coat. The invention further provides for the resultantly coated article.

DETAILED DESCRIPTION

The essential ingredients of the crosslinkable compositions of the present invention are the polyepoxides, the polyacid curing agent, components with volatilize at curing temperature and the monocarboxylic acid.

Among the polyepoxides which can be used are epoxy-containing acrylic polymers which are preferred, epoxy condensation polymers such as polyglycidyl ethers of alcohols and phenols and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate and 2-ethylhexyl acrylate.

Examples of other copolymerizable ethylenically unsaturated monomers are vinyl aromatic compounds such as styrene and vinyl toluene; nitriles such as acrylonitrile and methylacrylonitrile; vinyl and vinylidene halides such as vinyl chloride and vinylidene fluoride and vinyl esters such as vinyl acetate. Acid group-containing copolymerizable ethylenically unsaturated monomers such as acrylic and methacrylic acid are preferably not used because of the possible reactivity of the epoxy and acid group.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional free radical initiated organic solution polymerization as generally described above.

The epoxy-containing acrylic polymer typically has a number average molecular weight between about 1000 and 20,000, preferably 1000 to 10,000, and more preferably 1000 to 5000. The molecular weight is determined by gel permeation chromatography using a polystyrene standard. In determining molecular weights in this fashion, it is not the actual molecular weights which are measured but an indication of the molecular weight as compared to polystyrene. The values which are obtained are commonly referred to as polystyrene numbers. However, for the purposes of this invention, they are referred to as molecular weights.

The epoxy condensation polymers which are used as polyepoxides, that is, those having a 1,2-epoxy equivalency greater than 1, preferably greater than 1 and up to about 3.0. Examples of such epoxides are polyglycidyl ethers of polyhydric phenols and aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)propane (bisphenol A), 1,1-bis(4-hydroxyphenyl)ethane and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can also be used. Examples of these materials are described in U.S. Pat. No. 4,102,942 in column 3, lines 1-16. Specific examples of such low molecular weight polyepoxides are 3,4-epoxycyclohexylmethyl 3,4-epoxycyclohexanecarboxylate and bis(3,4-epoxycyclohexylmethyl)adipate. These materials are aliphatic polyepoxides as are the epoxy-containing acrylic polymers. As mentioned above, the epoxy-containing acrylic polymers are preferred because they result in products which have the best combination of coating properties, i.e., smoothness, gloss, durability and solvent resistance. Such polymers have been found to be particularly good in the formulation of clear coats for color-plus-clear applications.

Preferably, the polyepoxides are those which have a glass transition temperature less than 50° C., preferably less than 30° C., and the crosslinkable compositions are liquid compositions. The glass transition temperature (Tg) is described in PRINCIPLES OF POLYMER CHEMISTRY, Flory, Cornell University Press, Ithaca, NY, 1953, pages 52-57. The Tg can be calculated as described by Fox in Bull. Amer. Physic. Soc., 1, 3, page 123 (1956). The Tg can be determined experimentally such as by using a penetrometer such as a DuPont 940 Thermomedian Analyzer. The Tg of the polymers as used herein refers to the calculated values unless otherwise indicated.

In a preferred embodiment of the invention, the polyepoxide is a mixture of an epoxy-containing acrylic polymer mentioned above and a lower molecular weight polyepoxide, preferably an epoxy condensation polymer or the polyepoxide monomers and oligomers mentioned above which have a molecular weight less than 800. The blend of epoxy-containing acrylic polymer and low molecular weight polyepoxide provides for the best blend of gloss, solids content and cure response in the resultant cured coating and coating composition.

The polyepoxide is typically present in the liquid crosslinkable composition in amounts of about 25 to 75, preferably from 30 to 60 percent by weight based on total weight of resin solids. When the lower molecular weight polyepoxide is used, it is typically used in amounts of 1 to 40, preferably 5 to 30 percent by weight based on total weight of resin solids.

The polyacid curing agent contains two or more acid groups per molecule which are reactive with the polyepoxide to form a crosslinked coating as indicated by its resistance to organic solvent. The acid functionality is preferably carboxylic acid, although acids such as sulfonic acid may be used but their use is not preferred. Preferably, the polyacid curing agent is a carboxyl-terminated material having at least two carboxyl groups per molecule. Among the polyacid curing agents which may be used include carboxylic acid group-containing polymers such as acrylic polymers, polyesters, and polyurethanes; oligomers such as ester group-containing oligomers and monomers. The equivalent ratio of polyacid to monocarboxylic acid is from 5-20 to 1. Preferably, the polyacid curing agent has a Tg less than 30° C. Such low Tg materials enable the formation of high solids liquid compositions. Higher Tg materials require the use of more solvent.

The preferred polyacid curing agents are ester group-containing oligomers. Examples include half-esters formed from reacting polyols and 1,2-acid anhydrides. The half-esters are preferred because they are of relatively low molecular weight and are quite reactive with epoxy functionality enabling the formulation of high solids fluid compositions while maintaining outstanding properties such as gloss and distinctness of image.

The half-ester is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and provide lower volatile organic contents in the coating composition while still providing for excellent properties in the resultant coating. By substantially no polyesterification occurring means that the carboxyl groups of the anhydride are not esterified by the polyol in a recurring manner. By this is meant that less than 10, preferably less than 5 percent by weight polyester is formed.

Two reactions may occur in combining the anhydride and the polyol together under suitable reaction conditions. The desired reaction mode involves ring opening the anhydride ring with hydroxyl, i.e.,

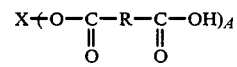

where X is the residue of the polyol after reaction with 1,2-dicarboxylic acid anhydride, R is an organic moiety associated with the anhydride and A is equal to at least 2.

Subsequently, carboxyl groups formed by opening of the anhydride ring may react with hydroxyl groups to give off water via a condensation reaction. This latter reaction is not desired since it can lead to a polycondensation reaction resulting in products with higher molecular weights.

To achieve the desired reaction, the 1,2-acid anhydride and polyol are contacted together usually by mixing the two ingredients together in a reaction vessel.

Preferably, reaction is conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would require esterification by condensation elimination water which would have to be removed by distillation. Under these conditions this would promote undesired polyesterification. Also, the reaction temperature is preferably low, that is, no greater than 135° C., preferably less than 120° C., and usually within the range of 70°–135° C., preferably 90°–120° C. Temperatures greater than 135° C. are undesirable because they promote polyesterification, whereas temperatures less than 70° C. are undesirable because of sluggish reaction.

The time of reaction can vary somewhat depending principally upon the temperature of reaction. Usually the reaction time will be from as low as 10 minutes to as high as 24 hours.

The equivalent ratio of anhydride to hydroxyl on the polyol is preferably at least about 0.8:1 (the anhydride being considered monofunctional) to obtain maximum conversion to the desired half-ester. Ratios less than 0.8:1 can be used but such ratios result in increased formation of less preferred half-esters.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahyrophthalic anhydride, chlorendic anhydride, itaconic anhydride, citraconic anhydride and maleic anhydride.

Among the polyols which can be used are those which contain from about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, trimethylolpropane, 2,2,4-trimethylpentane-1,3-diol, pentaerythritol and 1,2,3,4,-butanetetrol. Aromatic polyols such as bisphenol A and bis(hydroxymethyl)xylene can also be used.

In addition to the acid group-containing polymers and oligomers mentioned above, monomers containing at least two acid groups can also be used. Examples of suitable monomeric polycarboxylic acids are those containing from 5 to 20 carbon atoms and include open chain, cyclic, saturated, unsaturated and aromatic acids. Examples include succinic acid, adipic acid, azelaic acid, sebacic acid, hexahydrophthalic acid, maleic acid, cyclohexene-1,2-dicarboxylic acid and phthalic acid.

The polyacid curing agent is typically present in the coating composition in amounts of about 20 to 75, preferably 20 to 50 percent by weight based on total weight of resin solids.

The compositions of the present invention also contain components which volatilize at curing temperature. These components include certain organic solvents as well as components which release volatile components upon curing such as aminoplast which releases water, and in the case of an alkylated aminoplast, releases alcohols.

Examples of organic solvents which volatilize at curing temperatures (usually 160°–350° F., 71°–177° C.) are those having a boiling point (at 1 atmosphere) of 300° F. (149° C.) and below and include ketones such as acetone, methyl ethyl ketone and methyl isobutyl ketone, hydrocarbons such as xylene and toluene, esters such as ethyl acetate and butyl acetate. These components can cause popping which is the formation of bubbles or holes in the cured coating.

The volatile component can also come from the presence in the composition of ingredients such as an aminoplast which releases volatiles at curing temperature. Aminoplasts are reaction products of amines or amides such as melamine, benzoguanamine or urea with an aldehyde such as formaldehyde and optionally an alcohol containing up to 6 carbon atoms, usually 1 to 4 carbon atoms, such as methanol and butanol. These materials are well known in the coatings art and are available under the trademarks CYMEL and RESIMINE. The preferred aminoplast is a condensate of melamine formaldehyde and an alcohol such as methanol and butanol including mixtures thereof. Such products are commercially available as CYMEL 325 and RESIMINE 717.

The aminoplast may be present in the composition in amounts of 1 to 30, preferably 5 to 25 percent by weight based on total weight of resin solids.

Also present in the composition is a monocarboxylic acid which is an aliphatic, preferably saturated monocarboxylic acid containing at least 6, preferably from 8 to 22, more preferably 12 to 18 carbon atoms. Examples of such monocarboxylic acids include isostearic acid, lauric acid, tridecanoic acid, myristic acid and palmitic acid or mixtures thereof. Isostearic acid is preferred.

It has been found that the monocarboxylic acid improves the appearance of the resultantly cured coating particularly with regard to the development of holes or bubbles in the surface of the cured coating. Although not intending to be bound by any theory, it is believed the volatiles generated at curing temperature such as volatile solvents or alcohol generated from the aminoplast are trying to escape from the coating as it cures and become trapped in the partially crosslinked surface of the coating where they form holes or bubbles. It is believed the monocarboxylic acid retards the curing of the coating enough to permit the volatiles to escape before the coating has attained a sufficient crosslink density to trap the volatiles.

The monocarboxylic acid should be relatively non-volatile itself under curing conditions and should contain at least 6 carbon atoms. Monocarboxylic acids with carbon chains much above 22 carbon atoms can be used but are not preferred because they adversely affect physical properties of the coating.

The monocarboxylic acid is typically present in the composition in amounts of 0.1 to 15, preferably 0.5 to 10 percent by weight based on total weight of resin solids.

The compositions may also contain an anhydride, preferably an anhydride which is a liquid at 25° C. The presence of such an anhydride in the compositions provides for an improved cure response. Examples of suitable anhydrides include alkyl-substituted hexahydrophthalic anhydrides wherein the alkyl group contains up to 7 carbon atoms, more preferably up to 4 carbon atoms, such as methyl hexahydrophthalic anhydride and dodecenyl succinic anhydride. The amount of the anhydride which is used can vary from 0 to 40 percent by weight based on total weight of resin solids.

The equivalent ratio of the reactants present in the composition is adjusted that fior each equivalent of epoxy there are 0.3 to 3.0, preferably 0.75 to 1.5 equivalents of carboxyl (anhydride if present being considered monofunctional).

The compositions will also preferably contain catalysts to accelerate the cure of the epoxy and acid groups. Examples of suitable catalysts are basic materials and include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide. The amount of catalyst is typically from 0 to 10, preferably 0.5 to 3 percent by weight based on weight of resin solids.

Also, optional ingredients such as plasticizers, antioxidants, and UV light absorbers can be included in the composition. These ingredients typically are present in amounts of up to 25 percent by weight based on total resin weight.

The polyepoxide-polyacid compositions are liquid compositions and preferably are formulated into liquid high solids coating compositions, that is, those coating compositions containing greater than 40, preferably greater than 50 percent by weight resin solids. The solids content is determined by heating the composition to 105°-110° C. for 1 to 2 hours to drive off the volatile material.

The curable compositions of the invention can be applied as coatings to a substrate by any of the conventional coating techniques such as brushing, spraying, dipping or flowing, but it is preferred that spray applications be used since this gives the best appearance. Any of the known spray techniques may be employed such as compressed air spraying, electrostatic spraying and either manual or automatic methods.

After application of the coating composition to the substrate, the coated substrate is heated to cure the coating. In the curing operation, solvents are driven off and the film-forming material of the top coat and/or of the base coat is crosslinked with the aid of any crosslinking agents present. The heating or curing operation is usually carried out at a temperature in the range of from 160°-350° F. (71°-177° C.) but if needed lower or higher temperatures may be used depending upon whether it is sufficient to activate any necessary crosslinking mechanisms. The thickness of the coating is usually from about 1 to 5, preferably 1.2 to 3 mils.

Preferably, the compositions of the present invention, particularly those prepared with the aliphatic polyepoxides, and more preferably with the epoxy-containing acrylic polymers, are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent top coat over the base coat.

The film-forming composition of the base coat can be any of the compositions useful in coating applications, particularly automotive applications in which the color-plus-clear coating applications are finding their most use. A film-forming composition conventionally comprises a resinous binder and a pigment to act as a colorant. Particularly useful resinous binders are acrylic polymers, polyesters including alkyds, and polyurethanes.

The resinous binder for the base coat can be an organic solvent-based material such as those described in U.S. Pat. No. 4,220,679, note column 2, line 24, continuing through column 4, line 40. Also, water-based coating compositions such as those described in U.S. Pat. No. 4,403,003 and U.S. Pat. No. 4,147,679 can also be used as the binder in the base coat composition. The resinous binder for the base coat can also be the curable composition of the present invention.

The base coat composition also contains pigments including metallic pigmentation to give it color. Examples of suitable pigmentations for the base coat are described in the aforementioned U.S. Pat. Nos. 4,220,679; 4,403,003 and 4,147,679.

Optional ingredients in the base coat composition are those which are well known in the art of formulating surface coatings and include surfactants, flow control agents, thixotropic agents, fillers, anti-gassing agents, organic co-solvents, catalysts and other customary auxiliaries. Examples of these materials and suitable amounts are described in the aforementioned U.S. Pat. Nos. 4,220,679; 4,403,003 and 4,147,679.

The base coat compositions can be applied to the substrate by any of the conventional coating techniques such as brushing, spraying, dipping or flowing, but they are most often applied by spraying. The usual spray techniques and equipment for air spraying and electrostatic spraying in either manual or automatic methods can be used.

During application of the base coat to the substrate, a film of the base coat is formed on the substrate typically in a thickness of about 0.1 to 5 and preferably about 0.1 to 2 mils.

After forming a film of the base coat on the substrate, solvent, that is, organic solvent and/or water, is driven out of the base coat film by heating or simply an air drying period before application of the clear coat. Preferably, the heating step will only be that sufficient and for a short period of time to insure that the clear top coat composition can be applied to the base coat without the former dissolving the base coating composition, that is, "striking in". Suitable drying conditions will depend on the particular base coat composition, on the ambient humidity with certain water-based compositions, but in general a drying time of from about 1 to 5 minutes at a temperature of about 80°-175° F. (27°-79° C.) will be adequate to insure that mixing of the two coats is minimized. At the same time, the base coat film is adequately wetted by the clear top coat composition so that satisfactory intercoat adhesion can be obtained. Also, more than one base coat and more than one top coat may be applied to develop optimum appearance. Usually between coats, the previously applied base coat or top coat is flashed, that is, exposed to ambient conditions for about 1 to 20 minutes.

The clear top coat composition is applied to the base coat by any of the conventional coating techniques mentioned above, although spray applications are preferred. As mentioned above, the clear top coat is applied to the base coat via a wet-on-wet technique before the base coat has been cured. The two coatings are then heated to conjointly harden both coating layers. Curing conditions such as described above can be used.

The invention will be further defined by reference to the following examples. Unless otherwise indicated, all parts are by weight.

EXAMPLES

The following Examples A-C show the preparation of a polyepoxide and two polyacid curing agents which are useful in the practice of the present invention.

Example A

| Ingredients | Weight in Grams | Percentage by Weight |
| --- | --- | --- |
| Glycidyl methacrylate | 2080.0 | 40.0 |
| Methyl methacrylate | 1716.0 | 33.0 |
| Butyl acrylate | 1300.0 | 25.0 |
| Styrene | 104.0 | 2.0 |
| VAZO-67[1] | 260.0 | 5.0 (on monomers) |
| Tertiary-butyl perbenzoate | 104.0 | 2.0 (on monomers) |
| Tertiary-butyl perbenzoate (post addition) | 26.0 | 0.5 (on monomers) |

[1]Alpha, alpha'-dimethylazobis(isobutyronitrile) available from E. I. duPont de Nemours and Company.

Xylene (2996.7 grams) was charged to a suitable reactor and heated to reflux to remove water through a Dean-Stark trap. The glycidyl methacrylate, methyl methacrylate, butyl acrylate and styrene were mixed together. The VAZO-67, first portion of tertiary-butyl perbenzoate and 500.0 grams of xylene were also premixed together. The premixture of vinyl monomers and the premixture of initiators were added simultaneously to the reaction vessel over a period of about 3 hours while maintaining the reaction temperature at reflux. At the completion of the addition, the reaction mixture was held at reflux for one hour followed by the addition of the second portion of tertiary-butyl perbenzoate and 100 grams of xylene. The reaction mixture was held for two hours at reflux followed by cooling to room temperature. The reaction mixture had a solids content of about 58 percent and a number average molecular weight of about 1300 as determined by gel permeation chromatography using a polystyrene standard.

Example B

A polyacid half-ester of 1-(3-hydroxy-2,2-dimethylpropyl)-3-hydroxy-2,2-dimethylpropionate (Ester Diol 204) and methylhexahydrophthalic anhydride was prepared from the following mixture of ingredients:

| Ingredients | Parts by Weight (in grams) |
| --- | --- |
| Ester Diol 204 | 2550.0 |
| Methylhexahydrophthalic anhydride | 4116.0 |
| Methyl isobutyl ketone | 1666.5 |
| Ethanol | 666.6 |

The Ester Diol 204 and 1466.5 grams of the methyl isobutyl ketone were charged to a reaction vessel and heated under a nitrogen atmosphere to 115° C. The methylhexahydrophthalic anhydride was added over a ninety minute period. The reaction mixture was then held at 115° C. for four hours. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.

Example C

A polyacid half-ester of trimethylolpropane and methylhexahydrophthalic anhydride was prepared from the following mixture of ingredients:

| Ingredients | Parts by Weight (in grams) |
| --- | --- |
| Trimethylolpropane | 491.7 |
| Methylhexahydrophthalic anhydride | 1848.0 |
| Methyl isobutyl ketone | 1002.7 |

The ingredients were charged to a reaction vessel and heated under a nitrogen atmosphere to 100° C. to initiate an exotherm. The reaction mixture was kept at 110°-120° C. for about four hours, and then cooled to room temperature. The reaction mixture had a solids content measured at 110° C. of about 69.8 percent and an acid value of 203.

The following examples show the preparation of various curable compositions useful as clear coats in composite color-clear coatings.

Example 1

| Ingredients | Parts by Weight (in grams) | Percent Resin Solids |
| --- | --- | --- |
| TINUVIN 328[1] | 3.0 | 3.0 |
| Methyl isobutyl ketone | 60.1 | — |
| RESIMINE 1170[2] | 23.8 | 20.0 |
| Epoxy-containing acrylic polymer of Example A | 78.7 | 47.2 |
| Ester Diol 104-methyl-hexahydrophthalic anhydride half-ester of Example B | 41.0 | 32.8 |
| DC-200 10 C.S.[3] (10% in xylene) | 1.0 | 0.1 |
| ARMEEN DM 12D[4] | 2.0 | 2.0 |
| EMERSOL 875[5] | 5.0 | 5.0 |

[1]Substituted benzotriazole UV light stabilizer from Ciba-Geigy Corporation.
[2]Methylolated melamine-formaldehyde from Monsanto Co.
[3]Silicone fluid from the Dow Corning Corporation.
[4]N,N—dimethyldodecylamine from AKZO Chemical.
[5]Isostearic acid from Emery Chemical Co.

The formulated coating composition contained 51.2 percent by weight resin solids and had a No. 4 Ford cup viscosity of 14.5 seconds.

Example 1-A

A composition similar to Example 1 was prepared but without the isostearic acid.

Example 2

A clear film-forming composition was prepared with the epoxy-containing acrylic polymer of Example A, bis(3,4-epoxycyclohexylmethyl)adipate and the trimethylolpropane-methyl-hexahydrophthalic anhydride half-ester of Example C. The formulation was prepared by mixing the following ingredients:

| Ingredients | Parts by Weight (in grams) | Percent Resin Solids |
|---|---|---|
| TINUVIN 328 | 3.0 | 3.0 |
| Methyl isobutyl ketone | 46.9 | — |
| DC-200 | 1.0 | 0.1 |
| ERL-4299[1] | 16.8 | 16.8 |
| ARMEEN DM 12D | 2.0 | 2.0 |
| Epoxy-containing acrylic polymer of Example A | 50.7 | 30.4 |
| RESIMINE 1170 | 23.8 | 20.0 |
| Trimethylolpropane-methyl-hexahydrophthalic anhydride half-ester of Example B | 46.9 | 32.8 |
| 2-ethylhexanoic acid | 10.0 | 10.0 |

[1]Bis(3,4-epoxycyclohexylmethyl) adipate from Union Carbide Corp.

The resultant formulated coating composition contained 56.1 percent resin solids and had a No. 4 Ford cup viscosity of 16 seconds.

Example 2-A

A composition similar to Example 2 was prepared but without the 2-ethylhexanoic acid.

Example D

A pigmented base coat composition containing aluminum flake pigmentation was prepared from the following mixture of ingredients:

| Ingredients | Parts by Weight (in grams) | Resin Solids | Pigment Solids |
|---|---|---|---|
| TINUVIN 328 | 3.0 | 3.0 | — |
| Hexyl acetate | 41.4 | — | — |
| Methyl isobutyl ketone | 4.4 | — | — |
| Flow control agent[1] | 22.7 | 10.0 | — |
| Acrylic polymer[2] | 71.4 | 50.0 | — |
| RESIMINE 1170 | 35.7 | 30.0 | — |
| Pigment paste[3] | 40.0 | 10.0 | 12.0 |

[1]Polymeric microparticle prepared in accordance with Example 11 of U.S. Pat. No. 4,147,688.
[2]Acrylic polymer prepared from 40 percent hydroxypropylacrylate, 20 percent styrene, 19 percent butyl acrylate, 18.5 percent butyl methacrylate, 2 percent acrylic acid and 0.5 percent methyl methacrylate. Polymer had a weight average molecular weight of about 5000; a solids content of 70 percent in butanol:methyl amyl ketone (8:92 weight ratio).
[3]Pigment paste contained the following ingredients:

| Ingredients | Parts by Weight (in grams) | Resin Solids | Pigment Solids |
|---|---|---|---|
| Aluminum flake[a] | 46.2 | — | 30.0 |
| Butyl acetate | 24.0 | — | — |
| RESIMINE 1170 | 29.8 | 25.0 | — |

[a]65 percent by weight non-leafing aluminum flakes in hydrocarbon solvent.

The ingredients were mixed in the order indicated at low shear with good agitation to form the pigmented base coating composition.

The base coat was spray applied to four steel panels at a temperature of 25° C. in two coats with a 90 second flash at room temperature between the coats. The thickness of the base coat was 0.6–0.7 mils. After a 3 minute flash at room temperature, the clear coat compositions of Examples 1, 1-A, 2 and 2-A were applied to the base coats in varying thicknesses from about 1 mil at the top of the panel to a thickness of about 3 mils at the bottom of the panel (wedge panels). The clear coats were applied in two coats with a 90 second flash at room temperature between the coats. After the second clear coat had been applied, the composite coating was given an air flash for 5 minutes and then baked (panel in horizontal position) for 30 minutes at 250° F. (121° C.).

The films were then investigated for popping which is holes or bubbles which developed in the surface of the cured coating. The thickness of the coating at which heavy popping was evidenced is reported in the Table below. The thicker the coating before popping was evidenced, the better result.

TABLE

Thickness of Coating at which Heavy Popping Occurs

| Example | Thickness of Coating (in mils) |
|---|---|
| 1 | 2.5 |
| 1-A | 1.9 |
| 2 | 2.5 |
| 2-A | 1.2 |

The results summarized in the Table above show that the isostearic acid and 2-ethylhexanoic acid significantly retarded popping in the cured coatings.

We claim:

1. A curable, liquid coating composition containing components which volatilize at or release volatiles at curing temperature comprising:
   (A) 30 to 60 percent by weight of a polyepoxide,
   (B) 20 to 50 percent by weight of a polyacid crosslinking agent, and
   (C) 0.1 to 15 percent by weight of a monocarboxylic acid containing at least 6 carbon atoms; the percentage by weight based on weight of resin solids and the equivalent ratio of (A) to (B)+(C) is 0.75–1.5 to 1 and the equivalent ratio of (B) to (C) is 5–20 to 1.

2. The composition of claim 1 in which the polyepoxide is a copolymer of a monoethylenically unsaturated monomer having at least one epoxy group and at least one monoethylenically unsaturated monomer which is free of epoxy groups.

3. The composition of claim 2 in which the copolymer has a number average molecular weight of between 1000 and 20,000.

4. The composition of claim 3 in which the copolymer is a copolymer of glycidyl acrylate or methacrylate with at least one other copolymerizable ethylenically unsaturated monomer.

5. The composition of claim 4 in which the other copolymerizable ethylenically unsaturated monomer comprises at least in part an alkyl ester of acrylic or methacrylic acid containing from 1 to 20 carbon atoms in the alkyl group.

6. The composition of claim 4 in which the glycidyl acrylate or methacrylate comprises from 5 to 60 percent by weight of the monomers used in preparing the epoxy-containing acrylic polymer.

7. The composition of claim 1 in which the polyacid curing agent is a carboxyl-terminated material having at least 2 carboxyl groups per molecule.

8. The composition of claim 7 in which the polyacid curing agent is a carboxyl-terminated polyester.

9. The composition of claim 8 in which the carboxyl-terminated polyester is a half-ester of the structure:

$$X\text{---}(O\text{---}\underset{\underset{O}{\|}}{C}\text{---}R\text{---}\underset{\underset{O}{\|}}{C}\text{---}OH)_A$$

where X is the residue of a polyol after reaction with a 1,2-dicarboxylic acid anhydride, R is an organic moiety associated with the anhydride, and A is equal to at least 2.

10. The composition of claim 1 which contains an aminoplast.

11. The composition of claim 10 in which the aminoplast is a condensate of melamine and formaldehyde.

12. The composition of claim 11 in which the aminoplast is alkylated and in which the alkyl group contains 1 to 4 carbon atoms.

13. The composition of claim 1 in which the monocarboxylic acid contains from 8 to 22 carbon atoms.

14. The composition of claim 13 in which the monocarboxylic acid contains from 12 to 18 carbon atoms.

15. The composition of claim 3 in which the cross-linkable composition contains a polyepoxide which has a molecular weight less than 800.

16. The composition of claim 10 in which the aminoplast is present in the composition in amounts of about 5 to 25 percent by weight based on weight of resin solids.

17. The composition of claim 1 in which the monocarboxylic acid is present in the composition in amounts of about 0.5 to 10 percent by weight based on weight of resin solids.

18. The composition of claim 1 which has a resin solids content of at least 50 percent by weight.

19. A curable, liquid coating composition containing components which volatilize at curing temperature comprising:
(A) 30 to 60 percent by weight of a polyepoxide including:
 (i) a copolymer of a monoethylenically unsaturated monomer having at least one epoxy group and at least one monoethylenically unsaturated monomer which is free of epoxy groups and the copolymer has a number average molecular weight of 1000 to 20,000,
 (ii) 5 to 30 percent by weight of a polyepoxide having a molecular weight of less than 800,
(B) 20 to 50 percent by weight of a carboxyl-terminated polyester curing agent which is a half-ester of the structure:

$$X\text{---}(O\text{---}\underset{\underset{O}{\|}}{C}\text{---}R\text{---}\underset{\underset{O}{\|}}{C}\text{---}OH)_A$$

where X is the residue of a polyol after reaction with a 1,2-dicarboxylic acid anhydride, R is an organic moiety associated with the anhydride, and A is equal to at least 2,
(C) 1 to 30 percent by weight of an aminoplast, and
(D) 0.1 to 15 percent by weight based on weight of resin solids of a monocarboxylic acid containing from 8 to 22 carbon atoms; the percentage by weight based on weight of resin solids; the equivalent ratio of (A) to (B)+(D) is 0.75–1.5 to 1 and the equivalent ratio of (B) to (D) is 5–20 to 1.

20. A process for applying a composite coating to a substrate which comprises applying to the substrate a colored film-forming composition to form a base coat and applying to said base coat a clear film-forming composition to form a transparent top coat over the base coat characterized in that the clear film-forming composition comprises the curable composition of claim 1.

21. The process of claim 20 in which the clear film-forming composition comprises the curable composition of claim 2.

22. The process of claim 20 in which the clear film-forming composition comprises the curable composition of claim 9.

23. The process of claim 20 in which the clear film-forming composition comprises the curable composition of claim 15.

24. The process of claim 20 in which the clear film-forming composition comprises the curable composition of claim 19.

25. A substrate coated in accordance with the process of claim 20.

26. A substrate coated in accordance with the process of claim 24.

* * * * *